(No Model.)

F. C. TAYLOR.
TEA OR COFFEE POT.

No. 359,292. Patented Mar. 15, 1887.

Witnesses.
A. Ruppert
Geo. W. DeLano

Inventor.
Francis C. Taylor,
by [signature]
atty

UNITED STATES PATENT OFFICE.

FRANCIS C. TAYLOR, OF DANBURY, CONNECTICUT.

TEA OR COFFEE POT.

SPECIFICATION forming part of Letters Patent No. 359,292, dated March 15, 1887.

Application filed January 4, 1886. Serial No. 187,520. (No model.)

*To all whom it may concern:*

Be it known that I, FRANCIS C. TAYLOR, of Danbury, in the county of Fairfield and State of Connecticut, have invented a new and useful Improvement in Tea or Coffee Pots, of which the following is a specification, reference being had to the accompanying drawings, and to the letters of reference marked thereon.

My invention consists in certain combinations of parts, as will be hereinafter specified.

Figure 1:
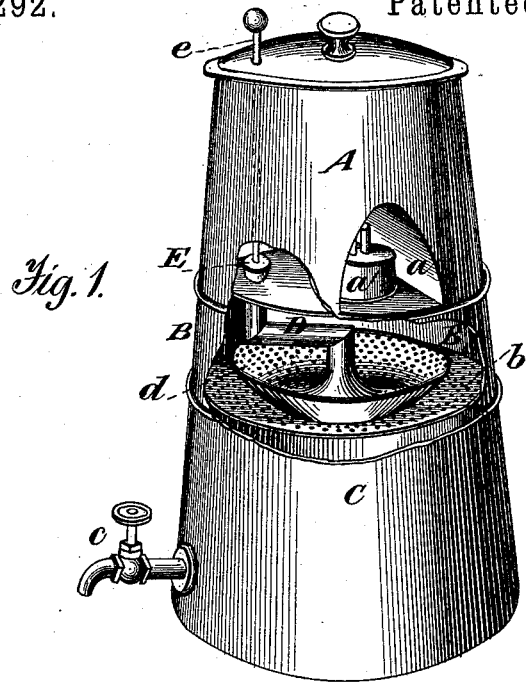
Figure 2:
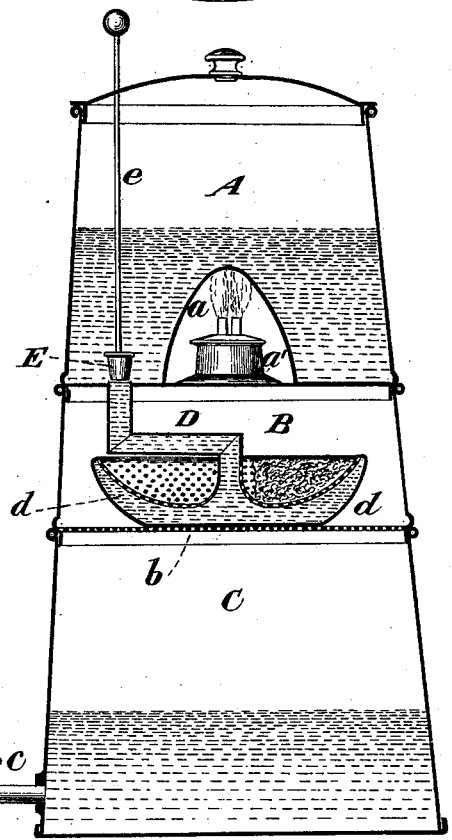

Figure 1 is a perspective view of a tea or coffee pot, and Fig. 2 is a vertical section.

Similar letters of reference indicate similar parts in the respective figures.

A is a water-chamber provided with a conical recess, $a$, for the reception of a lamp, $a'$. The chamber A is supported on a second chamber, B, which has a perforated bottom, $b$. This chamber B in its turn is supported by another chamber, C, which is the receptacle for the infusion of tea or coffee when ready for use. The chamber C is provided with a spigot, $c$, for drawing off the tea or coffee.

D is a pipe, one end of which is soldered into the bottom of the chamber A, the other end being provided with a chamber, $d$. The bottom of the chamber $d$ is flat; but its upper face is concave, and is provided with perforations, for the purpose hereinafter described. The chamber $d$ rests on the bottom of the chamber B.

E is a plug fastened to a wire, $e$, which extends up through the top of the chamber A. The plug E is used to stop the pipe D, when it is required, to prevent the flow of water from the chamber A.

In using my tea or coffee pot I place the tea or coffee on the upper face of the chamber $d$. I then remove the plug E from the pipe D, when the water will flow from the chamber A into the interior of the chamber $d$ and escape through the perforations in its upper face, and thus pass through the tea or coffee, which, by means of the upward flow of the water, will be kept constantly agitated. The infusion will then pass through the perforations in the bottom $b$ of the chamber B into the chamber C, whence it can be drawn, as required.

Having described my invention, I claim—

A tea or coffee pot in which are combined a chamber, A, having a recess, $a$, a chamber, B, having a perforated bottom, $b$, a chamber, C, provided with a spigot, a lamp, $a'$, and a chamber, $d$, having a valved pipe connecting it with the chamber A, the several parts being arranged substantially as set forth.

In testimony whereof I hereunto set my hand and seal.

FRANCIS C. TAYLOR. [L. S.]

Witnesses:
 GEO. W. DELANO,
 JAMES BRISBANE.